US012762142B2

(12) United States Patent
Ravilla et al.

(10) Patent No.: US 12,762,142 B2
(45) Date of Patent: Oct. 13, 2026

(54) CYBER SECURITY DATA PRODUCTS

(71) Applicant: WELLS FARGO BANK, N.A., San Francisco, CA (US)

(72) Inventors: Mouli Ravilla, Glen Mills, PA (US); Dabit Acharya, Plano, TX (US); Swati R. Gollamudi, Cumming, GA (US); Yvette Gonzalez, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 19/169,462

(22) Filed: Apr. 3, 2025

(65) Prior Publication Data

US 2026/0310677 A1 Oct. 8, 2026

(51) Int. Cl.
*G06F 16/25* (2019.01)

(52) U.S. Cl.
CPC .................................. *G06F 16/254* (2019.01)

(58) Field of Classification Search
CPC ..................................................... G06F 16/254
See application file for complete search history.

(56) References Cited

U.S. PATENT DOCUMENTS

| | | | | |
|---|---|---|---|---|
| 9,367,619 | B2 * | 6/2016 | Katiyar | G06F 16/951 |
| 11,003,645 | B1 * | 5/2021 | Thompson | G06F 16/904 |
| 12,079,352 | B2 * | 9/2024 | Apostolatos | G06F 16/258 |
| 12,394,506 | B2 * | 8/2025 | Wilkinson | G06Q 10/00 |
| 12,445,494 | B2 * | 10/2025 | Gerovich | H04L 63/20 |
| 12,524,820 | B2 * | 1/2026 | Cella | G06Q 10/40 |
| 2017/0199913 | A1 * | 7/2017 | Azzam | G06F 16/2465 |
| 2019/0238952 | A1 * | 8/2019 | Boskovich | H04N 21/23418 |
| 2020/0210427 | A1 * | 7/2020 | Dugan | G06F 21/6218 |
| 2022/0198562 | A1 * | 6/2022 | Cella | G06Q 40/04 |
| 2022/0245574 | A1 * | 8/2022 | Cella | G06Q 10/087 |
| 2022/0247678 | A1 * | 8/2022 | Atwal | H04L 45/645 |
| 2023/0362091 | A1 * | 11/2023 | Michaud | H04L 45/42 |

(Continued)

OTHER PUBLICATIONS

Data Mesh Architecture: Designing Data Products, Available online at: https://www.datamesh-architecture.com/data-product-canvas, Accessed from Internet on Oct. 6, 2025, 5 pages.

(Continued)

*Primary Examiner* — Mark E Hershley
(74) *Attorney, Agent, or Firm* — Kilpatrick Townsend & Stockton LLP

(57) ABSTRACT

Systems and methods for generating data products using a data model. An example system includes one or more processors, and a memory coupled to the one or more processors. The memory includes instructions that, when executed by the one or more processors, cause the one or more processors to generate a data model for managing data and generating data products from one or more data sources, wherein the data products comprise source data products, consumer data products, and aggregated data products. The data model includes data ingestion logic, data integration logic, and data transformation logic. The instructions further cause the processor to create, using the data model, one or more data products, and load the data products into a network-accessible repository accessible by one or more downstream devices, each downstream device being associated with domain specific entity.

20 Claims, 5 Drawing Sheets

100

(56) References Cited

U.S. PATENT DOCUMENTS

| | | | | |
|---|---|---|---|---|
| 2024/0152493 | A1* | 5/2024 | Goddijn | G06F 16/215 |
| 2024/0273411 | A1* | 8/2024 | Mueck | H04L 9/3263 |
| 2024/0281410 | A1* | 8/2024 | Williams | G06F 16/122 |
| 2024/0281419 | A1* | 8/2024 | Alfaras | G06F 16/215 |
| 2025/0077311 | A1* | 3/2025 | Rangarajan | G06F 9/541 |
| 2025/0173694 | A1* | 5/2025 | Motlagh | H04L 63/08 |
| 2025/0259144 | A1* | 8/2025 | Crabtree | G06Q 30/0601 |
| 2025/0272359 | A1* | 8/2025 | Katz | G06F 18/2431 |
| 2025/0342141 | A1* | 11/2025 | Leibundguth | G06F 16/2228 |
| 2025/0342149 | A1* | 11/2025 | Adams | G06F 16/2358 |
| 2025/0355889 | A1* | 11/2025 | Subramaniam | G06F 16/254 |
| 2026/0006071 | A1* | 1/2026 | Mainardi | H04L 63/1458 |

OTHER PUBLICATIONS

Practical Guide to Data Products, Available online at: https://www.k2view.com/what-is-a-data-product/, Sep. 10, 2025, 12 pages.

What is a Data Product?, Available online at: https://www.datamesh-manager.com/learn/what-is-a-data-product, Accessed from Internet on Oct. 6, 2025, 11 pages.

Moses et al., Building an "Amazon.com" For Your Data Products, Available online at: https://www.thoughtworks.com/en-in/insights/blog/data-strategy/building-an-amazon-com-for-your-data-products, Jun. 30, 2023, 15 pages.

Mott, What are the Different Types of Data Products, Available online at: https://www.starburst.io/blog/what-are-the-different-types-of-data-products/, Dec. 16, 2022, 10 pages.

Rigol, Data as a Product vs Data | What are the differences?, Available online at: https://towardsdatascience.com/data-as-a-product-vs-data-products-what-are-the-differences-b43ddbb0f123/, Jul. 8, 2021, 12 pages.

Sundaram, "Data Product" vs "Data as a Product": A Domain-Centric Perspective, Available online at: https://medium.com/@gayarathna/data-product-vs-data-as-a-product-f77baba6284b, Feb. 6, 2024, 10 pages.

* cited by examiner

400

500

CYBER SECURITY DATA PRODUCTS

TECHNICAL FIELD

The present disclosure generally relates computer-based systems for managing data, and more particularly to a data model for managing data.

BACKGROUND

A number of technology platforms exist that provide users or business the ability to collect and store large amounts of data. Databases may exist to provide users or business the ability to gain business insights on data. Databases may also include data that describes the stored data, which is referred to as metadata. Much of the data that is consumed by end users or businesses comes from multiple upstream systems and sources. The volume, complexity, and changing nature of data and metadata makes it difficult to maintain, and there is a need in the art for improved techniques for managing data.

SUMMARY

Certain aspects and features of the present disclosure generally relate to computer-based systems for managing data, and more particularly to a data model for managing data. According to an aspect of the present disclosure, a system includes one or more processors and a memory coupled to the one or more processors. The memory including instructions that, when executed by the one or more processors, cause the one or more processors to generate a data model for managing data and generating data products from one or more data sources. The data products comprise source data products and consumer data products. The data model includes: data ingestion logic configured to establish a data contract with one or more of the data sources and classify the data received from the data source; data integration logic configured to integrate one or more source datasets together to thereby generate a source data product; and data transformation logic configured to transform one or more source data products, based on a consumer's specific requirements, into a consumer data product. The consumer data product can be aligned with a functional context of particular consumer requirements and aligned to a particular data domain. The instructions further cause the one or more processors to create, using the data model, one or more data products, and load the data products into a network-accessible repository accessible by one or more downstream devices, each downstream device being associated with domain specific entity. In some implementations, the data products can further comprise aggregated data products, wherein aggregated data products are generated by the data model based on a consumer's specific requirement to represent a functional context across multiple data domains.

The above system may be implemented in a cloud service executed on cloud service provider infrastructure, which may include various servers, processors, and databases. The above system can also be implemented as computer-executable program instructions stored in a non-transitory, tangible computer-readable medium or media and/or operating within a system including one or more processors or other processing device and memory.

An additional example includes a method. The method includes generating a data model for managing data and generating data products from one or more data sources. The data products comprise source data products and consumer data products. The data model includes: data ingestion logic configured to establish a data contract with one or more of the data sources and classify the data received from the data source; data integration logic configured to integrate one or more source datasets together to thereby generate a source data product; and data transformation logic configured to transform one or more source data products, based on a consumer's specific requirements, into a consumer data product. The consumer data product can be aligned with a functional context of particular consumer requirements and aligned to a particular data domain. The method further includes creating, using the data model, one or more data products, and loading the data products into a network-accessible repository accessible by one or more downstream devices, each downstream device being associated with domain specific entity.

An additional example includes a non-transitory computer-readable medium embodying program code that is executable by one or more processors to cause the one or more processors to generate a data model for managing data and generating data products from one or more data sources. The data products comprise source data products and consumer data products. The data model includes: data ingestion logic configured to establish a data contract with one or more of the data sources and classify the data received from the data source; data integration logic configured to integrate one or more source datasets together to thereby generate a source data product; and data transformation logic configured to transform one or more source data products, based on a consumer's specific requirements, into a consumer data product. The consumer data product can be aligned with a functional context of particular consumer requirements and aligned to a particular data domain. The instructions further cause the one or more processors to create, using the data model, one or more data products, and load the data products into a network-accessible repository accessible by one or more downstream devices, each downstream device being associated with domain specific entity.

This summary is not intended to identify the key or essential features of the claimed subject matter, nor is it intended to be used in isolation to determine the scope of the claimed subject matter. Rather, the summary is merely a simplified and non-limiting summary of the innovation that is intended to provide a basic understanding of some aspects of the innovation. The subject matter should be understood by reference to appropriate portions of the entire specification of this disclosure, any or all drawings, and each claim.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings, in which.

DETAILED DESCRIPTION

Figure 1:
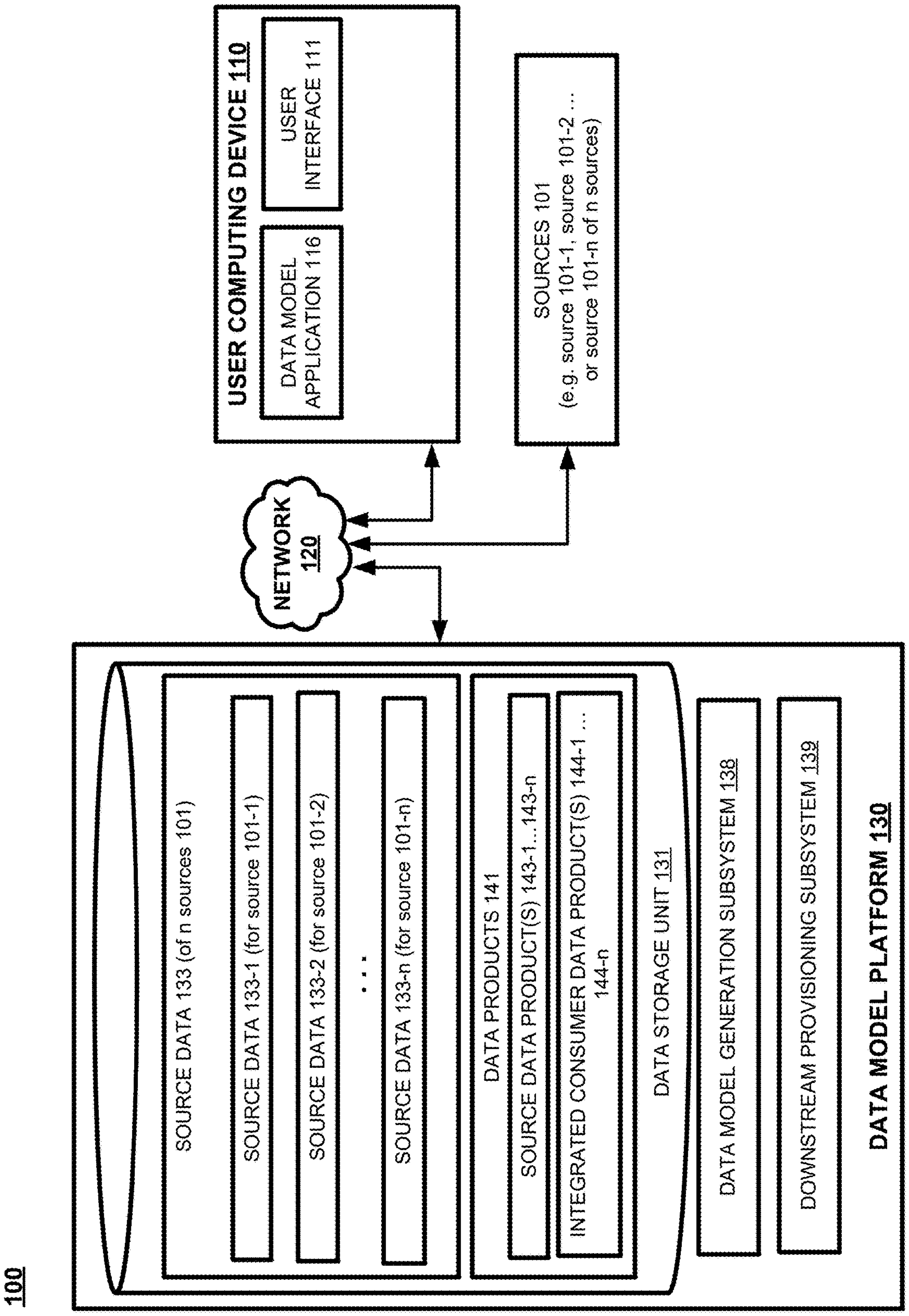
FIG. 1 is a block diagram of an example system for generating a data model according to one or more aspects of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary," or "example" is not necessarily to be construed as preferred or advantageous over other embodiments or designs.

Reference will now be made in detail to various and alternative illustrative examples and to the accompanying drawings. Each example is provided by way of explanation, and not as a limitation. It will be apparent to those skilled in the art that modifications and variations can be made. For instance, features illustrated or described as part of one example may be used on another example to yield a still further example. Thus, it is intended that this disclosure include modifications and variations as come within the scope of the appended claims and their equivalents.

Illustrative Example of Data Model Generation

In the enterprise setting, a number of technology platforms exist (e.g., internal or external tools) that provide users or business units within the enterprise the ability to collect and store large amounts of data. Such large amounts of data may be received (e.g., through interfacing with one or more application programming interfaces (APIs)) and stored by an enterprise in a central repository, often referred to as a "data lake" or "data mesh." Users or business units within the enterprise may access the stored data in the central repository for various downstream use cases such as various analytics or insights processes performed by the enterprise. In general, this disclosure describes a computing system configured to generate a data model for managing and organizing such large amounts of data in a way that enables independent usability, robustness for downstream use cases, and transparency into the data within the enterprise context. The described techniques ensure appropriate usage of data as well as corrective actions to be taken when necessary.

According to one illustrative example, a computing system generates a data model configured to manage and organize data received from data sources and/or data sets with the goal of generating data products usable in downstream use cases. The data model includes various modules and logic configured to receive data from one or more data sources and/or data sets and configured to process such inputs for downstream use cases. Overall, the computing system and generated data model described herein may provide a comprehensive and secure approach to managing data by consolidating and aligning data sources and data use cases, adhering the data organization to one or more data governance policies, providing domain aligned APIs aligned to specific data domains within a business, normalizing inputs to a structured output, and ensuring that data received from the multiple upstream sources is robust, accurate, and independently reusable.

The data model is designed to generate "data products." A data product may refer to a domain aligned and domain owned data asset. Data products provide a clear lineage of data ownership thus improving security around the data, are autonomous meaning they can be modified with minimal impact to other data products, are readily discoverable by virtue of centralized storage, are self-describing via integrated metadata, and are interoperable across a variety downstream use. Data products are grouped together based on functional context and include all the data components needed to make the data product independently usable for authorized consumers (e.g., downstream users such as individual users or business units within the enterprise). Data products can comprise multiple categories. One type of data product is a source data product. Source data products integrate data from multiple data sources and data sets and represent the data in a standardized format for better quality and reusability for downstream use cases. The above-mentioned data model can generate source data products via receipt of data from multiple upstream data sources, by performing a cleaning and quality check on the data, and then furnishing the source data product for further downstream consumption. Another type of data product is a consumer data product. Consumer data products comprise and integrate of one or more source data products.

The data model includes modules and various levels of computer logic for processing the data received from input data sources and/or data sets. A first processing module of the data model includes data ingestion logic, a second processing module of the data model includes data transformation logic, and a third processing module of the data model includes data integration logic. Additional modules and processing logic are also possible, such as compatibility logic. The various processing modules and incorporated processing logic are configured to manage and organize data received from a plurality of data sources and generate data products for downstream use cases. Such processing involves retrieving one or more data sources from one or more of a plurality of data platforms (e.g., data sources) via one or more API calls (e.g., via SQL queries, web scraping, file parsing, etc.), transforming the data in a usable format by collecting, integrating, and consolidating data from one or more data platforms into a single, unified format or view. Additional processing may be performed on the data such as filtering, sorting, clean, validate, normalize, and/or transforming the data such that it is consistent, accurate, and understandable for ease of consumption by other downstream systems, such as a data warehouse, a business intelligence tool, or a machine learning model. For instance, the data model can collect data use cases associated with the data (including regulatory use cases, risk use cases, operational use cases, etc.) as part of the data product generation process. In addition, the data model can be network-accessible by the various downstream users (e.g., individual users and/or business units). In this way, the data model can be considered centrally located via a remote network access.

Moreover, the described data model can be configured to maintain one or more enterprise established guidelines, policies and/or procedures set forth by an enterprise for data lineage, data security, data risks, data controls, data privacy, and/or data audit trails. Such enterprise established guidelines are used to define data domains aligned with the generated data products for a particular reporting structure. For instance, the enterprise established guidelines can be used to tag the data and corresponding data products, for example with data use cases, to assist in downstream users. Additionally, the one or more enterprise established guidelines may preconfigure authorizations for downstream users who have or do not have access to the one or more generated data products. Moreover, the data lineage and/or data audit trail tags enable downstream users to perform root cause analysis and error handling that occurs during the data collection, integration, and consolidation process to better understand the generated data products (e.g., ensure accuracy and completeness of the data included within the data product).

The data model can load (e.g., store) the data products in a network-accessible data store available to downstream users. Such downstream users may query and/or request data products from the data store for various downstream use cases such as insights analysis, reporting, scorecards, and metrics for transparency on the status of data assets and corrective actions to provide executive level accountability for data quality, data risks, data controls, and data issues in an enterprise setting. In this way, the data model may provide users and/or businesses an insightful and organized view of data that may aid in making business decisions. Such reporting capabilities of the data model also aid in simplifying data flows, as the insights provided by the data model may identify which data sources are of low quality or have little value add to a certain process.

The described techniques provide improvements to be the functioning of a computer as well as improvements to the technical field of data management. For example, in many businesses, data is often managed within multiple different teams by multiple different leaderships. As a result, data may be managed manually and in an ad hoc fashion by using multiple different nonconsolidated spreadsheets, emails, or sharepoints. The techniques of this disclosure may replace ad hoc enterprise data management repositories that were built using spreadsheets or sharepoints with a standardized and centralized data model that automatically consolidates all data across an enterprise into independently reusable data products. Further, the techniques of this disclosure may replace ad hoc data collection interfaces that were built using emails or SharePoint with standard APIs. As such, the techniques of this disclosure may ensure greater data quality, accuracy, and completeness while also improving the efficiency of data collection. Yet another advantage of the techniques of this disclosure is that the generated data products are aligned to specific data domain use cases. In other words, the computing system described herein may be configured to integrate large amounts of data from a wide variety of data platforms or sources, create and analyze relationships between the integrated data, and present information about those relationships via reports or the front-end so that a user or business can draw conclusions about the state of the data.

While certain embodiments are described, these embodiments are presented by way of example only and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection. Further details regarding the systems and methods are provided below in relation to the drawings.

Example Systems for Creating Data Products Using a Data Model

Referring now to the drawings, FIG. 1 depicts a block diagram of an example system hosting a data model platform according to one or more aspects of the present disclosure. The computing environment 100 includes a data model platform 130 that can communicate via a network 120 with one or more user computing devices 110. In certain embodiments, the user device computing device 110 includes a user interface 111 and a data model application 116.

The user interface 111 enables a user to interact with the user computing device 110. The user interface 111 may be a touch screen interface, a voice-based interface, or any other interface that allows users to provide input and receive output from one or more applications on the user computing device 110. A user of the user computing device 110 may interact with the data model application 116 via the user interface 111. In an example, the user interacts via the user interface 111 with the data model application 116 to access and/or request one or more data products generated by the data model platform 130.

The data model platform 130 can communicate with one or more user computing devices 110 via the network 120. In certain examples, the data model platform 130 includes a data storage unit 131, data model generation subsystem 138, and downstream provisioning subsystem 139.

The data storage unit 131 may comprise a local or remote storage device or other memory suitable for storing information accessible to data model platform 130. The data model platform 130 can store, in the data storage unit 131, source data 133, including data received from data domains, of a set of n sources 101 having a technical and/or business relationship with an enterprise hosting the data model platform 130. For each of the sources 101 (e.g., source 101-1, 101-2, . . . 101-*n*), the data model platform 130 can store, in the data storage unit 131, respective source data 133 (e.g., source data 133-1, 133-2, . . . 133-*n*) for each of the sources 101. In this example, the source data 133-1 includes data from a domain specific data source associated with the enterprise. For instance, source data 133-1 may be associated with a vulnerability management data sources data domain. It will be appreciated that a single data domain (e.g., vulnerability management data sources data domain) can include multiple different data sets. As such, in some examples, source data 133-1 may refer to all data sets from a data domain. However, this is not always required. For instance, in some other examples, source data 133-1, 133-2, and so on may each individually refer to a single data set from a single data domain.

The data model platform 130 can also store, in the data storage unit 131, data products 141, including source data product(s) 143-1 to 143-*n* and integrated consumer data product(s) 144-1 to 144-*n*, for access by one or more downstream users having a technical and/or business relationship with an enterprise hosting the data model platform 130 (e.g., individual users associated with the enterprise and/or business units within the enterprise). For each of the data products 141 generated by the data model from sources 101 (e.g., sources 101-1, 101-2, . . . 101-*n*), the data model platform 130 can store, in the data storage unit 131, respective data products 141 (e.g., source data product 143-1, 143-2, . . . 143-*n* and/or integrated consumer data product 144-1, 144-2, . . . 144-*n*). Such data products 141 may be accessible via request from a user, such as a user of user computing device 110. For instance, a user of user computing device 110 may interact with the data model platform 130 via data model application 116 and request a particular data product from data products 141 for further review and analysis as part of a particular downstream use case.

The data model platform further includes a data model generation subsystem 138. In some examples, the data model generation subsystem 138 is configured to generate a data model configured to process source data 133 and generate one or more data products 141. The data model and associated operations are described in more detail with respect to FIG. 2. In general, the data model created by the data model generation subsystem 138 is configured to retrieve one or more source data 133-1, 133-2, . . . **133-*n* from source data 133, which may have been received by the data model platform 130 via one or more API calls to sources 101 (e.g., data platforms and tools). The data model may then extract the relevant source data 133-1, 133-2, . . . 133-*n* for the particular data product of interest by collecting the source data 133-1, 133-2, . . . 133-*n*, integrating the source data 133-1, 133-2, . . . 133-*n* (e.g., combining it together), and consolidate the data into a single, unified, and structured format or view (e.g., data product). Consolidation can involve analyzing the source data 133-1, 133-2, . . . 133-*n*** and removing redundant data elements, for example.

According to one particular example, a particular data product (e.g., one of source data product(s) 143-1 . . . **143-*n*) may be configured to present a report regarding database vulnerabilities within an enterprise. The generated data model generated by data model generation subsystem 138 can source the relevant database vulnerabilities source data 133 from the appropriate upstream sources (e.g., sources 101). The data model can consolidate the source data 133 into a single, unified, and structured format or view. In addition, the data model may identify that certain elements from the source data 133 may not be adding any value to the source data product 143-1 and thus the data flow can be simplified to remove such redundant or low value elements from the source data 133. The generated source data product 143-1 can be tagged with additional metadata to assist in independent reusability and robustness for downstream users (e.g., by tagging the source data product 143-1 with metadata including, but not limited to, a particular domain aligned use case (e.g., database vulnerability reporting/metrics), providing a data lineage of the source data 133 included in the source data product 143-1, and so on. In addition, after generating the source data product 143-1, other data products 141 may be generated. For instance, and using a similar process as previously described, a source data product 143-1 related to server vulnerabilities may be created. Then, in the case where a downstream user desires a comprehensive report on all infrastructure vulnerabilities, the downstream user can request an integrated consumer data product 144-1, for example, the consolidates all source data products related to the particular usage. As such, the data model may enable enterprises to understand which data from various data sources 133** is of appropriate quality to build accurate reporting, for example, as well as provide enterprises with a simplified data flow for understanding enterprise metrics.

The data model may then load (e.g., store) the generated data products 141 into the data storage unit 131 and may the data products available for one or more downstream uses. For example, a user of user computing device 110 may access the data model platform 130 via data model application 116 and request one or more data products 141 for a variety of different downstream uses such as insights analysis, reporting, scorecards, and metrics for transparency on the status of data assets and corrective actions to provide executive level accountability for data quality, data risks, data controls, and data issues. In this way, the data model may provide users and/or businesses an insightful and organized view of data that may aid in making business decisions. Additionally, the reporting capabilities of the data model may aid in simplifying data flows, as the insights provided by the data model may identify which data sources are of low quality or have little value add to a certain process.

Data model platform 130 also includes downstream provisioning subsystem 139. As mentioned previously, a user of user computing device 110 may request one or more data products 141 via interaction with data model application 116. Such requests may be received and processed by downstream provisioning subsystem 139. Downstream provisioning subsystem 139 can include additional features and functionality to improve the security of the data model platform 130. For example, user computing device 110 may be associated with certain permissions and/or authorization levels within the enterprise. As such, in some examples, data model platform 130 may analyze such permissions and/or authorization levels associated with the user and the requested data product prior to transmission of the data product via network 120 to the user interface 111 of the user computing device 110. As another example, the generated data products may be tagged with one or more data use cases and/or one or more enterprise-established guidelines. The downstream provisioning subsystem 139 may be configured in such a way such that it aligns specific data products with particular user computing devices 110 according to the one or more enterprise-established guidelines. For instance, data products generated from particular upstream sources 101 may be specific to a certain subject area as defined by their metadata (e.g., technology metadata, business metadata, security metadata, systems vulnerability metadata, etc.). Downstream provisioning subsystem 139 may extract this metadata and provide such data products 141 to downstream users who are associated with business units sharing a similar description as the extracted metadata (e.g., a financial department may have permissions and/or authorization to receive data products tagged with a "business metadata" tag). As another particular example, downstream provisioning subsystem 139 can be configured to implement specific security and privacy controls on the generated data products to protect the data within them. For example, if a data product contains personal information, such as credit card numbers, social security numbers, etc. the data product would be considered sensitive. As such, the downstream provisioning subsystem 139 may generate its own metadata indicating the data product includes sensitive information to ensure that the downstream user is aware of the sensitive information and is authorized to view it.

Figure 2:
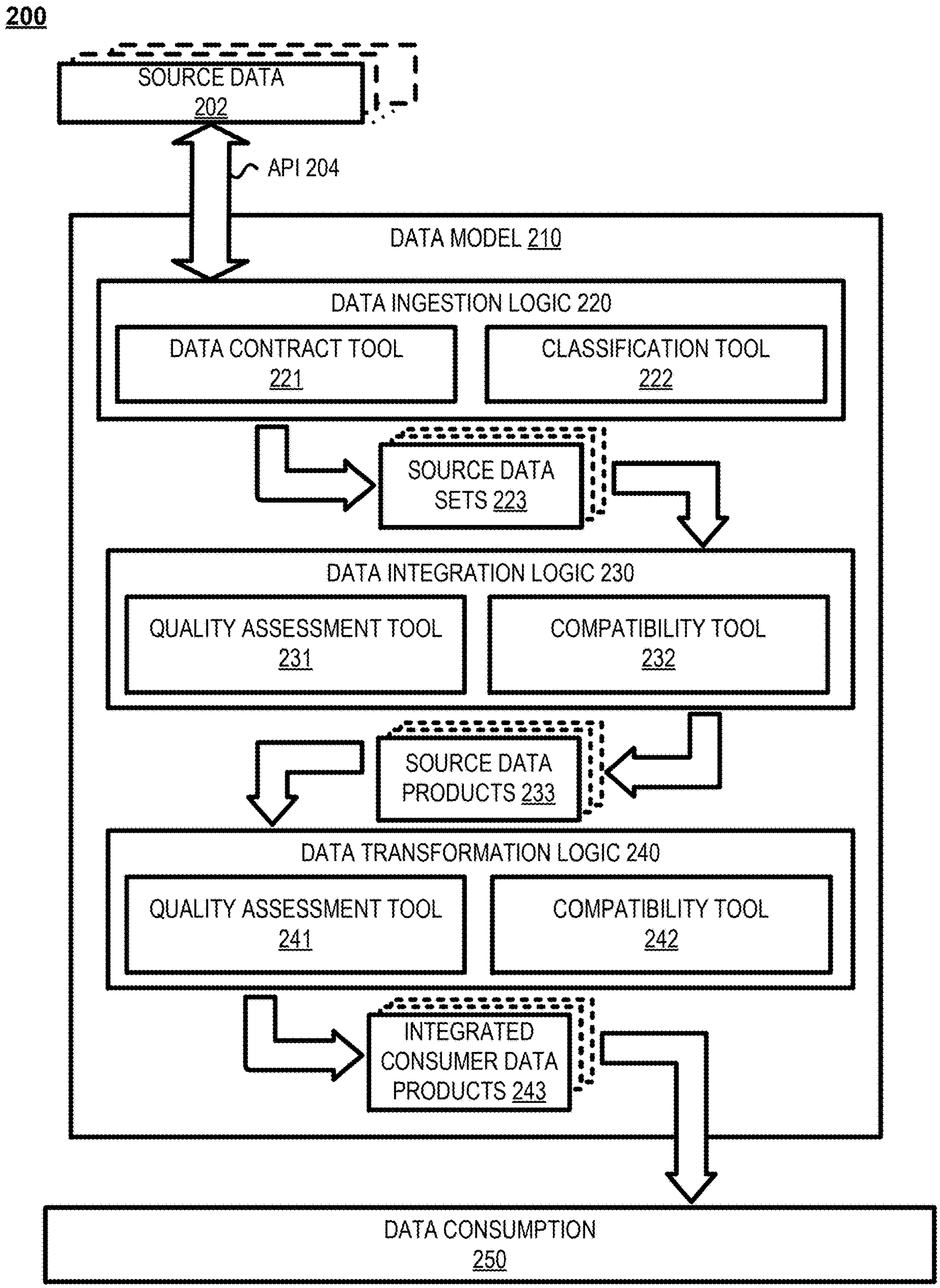
FIG. 2 is a block diagram illustrating an example data model according to one or more aspects of the present disclosure.

Turning now to FIG. 2, which depicts a block diagram illustrating an example computing environment 200 depicting a data model 210 according to one or more aspects of the present disclosure. Data model 210 includes data ingestion logic 220, data integration logic 230, and data transformation logic 240. Data model 210 is configured to receive source data 202 via one or more API 204 calls and to generate source data sets 223, source data products 233, and integrated consumer data products 243 for downstream data consumption 250. As described with respect to FIG. 1, and similar to sources 101, source data 202 may be specific to a particular data domain within an enterprise and may be received via API 204 from one or more data platforms having a technical and/or business relationship with an enterprise hosting the data model 210. Various non-limiting examples of data domains include vulnerability management data sources, software security data sources, third party cybersecurity data sources, governance and information protection data sources, network security data sources, software security data sources, defense and incident response data sources, identity and access management data sources, data security data sources, and so on.

The source data 202 is receive by the data ingestion logic 220 of the data model 210. As previously described with respective to FIG. 1, the source data may be received responsive to one or more API 204 calls initiated by the data model 210 where each API call is specific to a particular data domain. The data ingestion logic includes a data contract tool 221 and a classification tool 222. The data contract tool 221 is configured to establish a linkage between the data model 210 and the source data 202 (e.g., the underlying data platform hosting the source data 202). Establishment of a data contract ensures that the source data 202 is properly linked to downstream data consumption 250 and that source data 202 is protected and/or labeled correctly according to one or more enterprise-established guidelines (e.g., sensitivity labels, authorization labels, usage labels, etc.). Additionally, the data contract tool 221 can connect various different source data 202 together by identifying relationships between data sets or elements. For instance, one particular data domain may include a vulnerability management data domain and another data domain may include a network security data domain. As part of routine data collection by these data domains, each data domain may employ a data collection tool configured to query specific machine inventory (e.g., servers, devices, printers, and/or other IOT devices) to extract data, such as log files, configuration drift scans, and the like. As such, the data contract tool 221, may specify a relationship between the vulnerability management data domain and the network security data domain. This relationship establishing a connection between the various data sets and data elements enables the data model 210 to ensure the accuracy and robustness of the generated data products. For instance, a downstream user consuming the data would easily be able to verify that data extraction performed by various data platforms are receiving the same data.

Data ingestion logic 220 also includes classification tool 222. Classification tool 222 can be configured to classify source data 202. More specifically, classification tool 222 can extract metadata from the source data 202 (or generate new metadata) to verify and/or categorize the source data 202 into a particular use case. More specifically, and responsive to a data contract indicating a relationship between multiple sources, the classification tool 222 can classify the source data 202 as belonging to the same downstream use case (e.g., machine inventory analysis). Such classification may be achieved by performing, but the data ingestion logic 220, a semantic analysis on the metadata of the source data 202. Classification tool 222 may also be configured to label (e.g., generate new metadata for) the source data 202 based on one or more enterprise-established guidelines (e.g., classification guidelines), such as labeling the source data based on a sensitivity level, security level, and so on. The category specified by the classification tool 222 may be generated as additional metadata.

Data ingestion logic 220 is configured, after processing by the data contract tool and classification tool 222, to output source data sets 223. Source data sets 223 may represent a raw and unstructured form of the source data 202. Although not shown in FIG. 2, data ingestion logic 220 can be configured to perform automated quality checks on the source data 202 by applying validation rules and data quality metrics to ensure that the data is accurate and complete.

Data model 210 also includes data integration logic 230 configured to generate source data products 233 from the source data sets 223. Data integration logic 230 includes quality assessment tool 231 and compatibility tool 232. To generate the source data products 233, data integration logic is configured to transform the raw unstructured format of the source data sets 223 into a structured format. This involves aggregating the source data sets 223 into a unified and normalized structure that improves understandability and independent reusability for data consumption 250. Similar to data ingestion logic 220, data integration logic 230 can perform quality checks using quality assessment tool 231. Quality assessment tool 231 can apply validation rules and data quality metrics to ensure that the data is accurate and complete (e.g., to ensure no data was modified or lost from the source data 202 and to ensure that the data being used is of high quality and suitable for its intended use case). A level of quality determined by the quality assessment tool 231 may be tagged to the generated data product and viewable by a downstream user during data consumption 250. In some instances, if a level of quality of the data product is too low (e.g., satisfies a lower threshold), the data integration logic 230 can be configured to send a message to the data ingestion logic 220 to start over with the retrieval process. In some examples, determining the level of quality may be determined by performing a cross-verification (e.g., a comparison) between the source data 202 (i.e., the original raw form of the source data set) and the source data sets 223 to determine a data variance. In some examples, a machine learning model may be implemented by the quality assessment tool 231 to determine a numerical score for each data product that indicates the level of quality of the data source.

Data integration logic 230 also includes compatibility tool 232. Compatibility tool 232 improves upon the function of a computer by ensuring forward compatibility of the source data products 233. For instance, compatibility tool 232 can run in a testing mode to simulate an operating system (OS) of a downstream computing device performing data consumption 250. In the testing mode, the compatibility tool 232 can set one or more parameters to simulate the OS (e.g., by simulating one or more hardware and/or software components of the downstream device) and view the source data products 233. The testing mode can reveal errors, such as viewing and/or usability errors, that may occur when the source data product 233 is transmitted and viewed on the computing device of a downstream user. Responsive to detection of such errors, the data integration logic 230 may perform remediation and/or modification on the source data product for that particular downstream use case to ensure forward compatibility of the source data products 233.

Data integration logic 230 outputs source data products 233. As previously discussed, source data products 233 comprises a normalized version of the source data sets 223. In some cases, source data products 233 can represent a combination of one or more source data sets 223 combined for a particular downstream use. The source data products 233 are standardized for better quality and reusability in the enterprise context by providing improved data quality, accuracy, and completeness while also improving the efficiency of data collection.

Data model 210 further includes data transformation logic 240. Data transformation logic 240 can receive source data products 233 as input and transform multiple source data products 233 into integrated consumer data products 243. In this way, integrated consumer data products 243 may refer to an integrated form of source data products 233. Similar to data integration logic 230, data transformation logic 240 includes quality assessment tool 241 and compatibility tool 242. Because data transformation logic 240 performs additional processing on the source data products 233, quality assessment tool 241 is configured to apply validation rules and data quality metrics to ensure that the data in the integrated consumer data products 243 is accurate and complete (e.g., to ensure no data was modified or lost from the source data products 233 and to ensure that the data being used is of high quality and suitable for its intended use case). Similar to quality assessment tool 231, a level of quality determined by the quality assessment tool 241 may be tagged to the generated data product and viewable by a downstream user during data consumption 250. In some instances, if a level of quality of the data product is too low (e.g., satisfies a lower threshold), the data transformation logic 240 can be configured to send a message to the data integration logic 230 and/or the data ingestion logic 220 to start over with the processing and/or retrieval process. In some examples, a machine learning model may be implemented by the quality assessment tool 241 to determine a numerical score for each data product that indicates the level of quality of the data source. In some examples, data transformation logic 240 and data integration logic 230 may utilize the same quality assessment tool (e.g., one of quality assessment tool 231 or quality assessment tool 241).

Data transformation logic 240 also includes compatibility tool 242. Similar to compatibility tool 232, compatibility tool 242 can further improve upon the function of a computer by ensuring forward compatibility of the integrated consumer data products 243 by running in a testing mode to simulate an operating system (OS) (e.g., one or more hardware and/or software components) of a downstream computing device performing data consumption 250. In the testing mode, the compatibility tool 232 can set one or more parameters to simulate the OS (e.g., by simulating one or more hardware and/or software components of the downstream device) and view the integrated consumer data products 243 to reveal errors that may occur when the integrated consumer data products 243 is transmitted and viewed on the computing device of a downstream user. Responsive to detection of such errors, the data transformation logic 240 may perform remediation on the integrated consumer data products 243 for that particular downstream use case to ensure forward compatibility of the integrated consumer data products 243.

Data transformation logic 240 outputs integrated consumer data products 243. Both source data products 233 and integrated consumer data products 243 may be stored in a network accessible data store for access by data consumption 250 for various downstream use cases such as insights analysis, reporting, scorecards, and metrics for transparency on the status of data assets and corrective actions to provide executive level accountability for data quality, data risks, data controls, and data issues. In this way, the data model may provide users and/or businesses an insightful and organized view of data that may aid in making business decisions. Such reporting capabilities of the data model also aid in simplifying data flows, as the insights provided by the data model may identify which data sources are of low quality or have little value add to a certain process.

Figure 3:
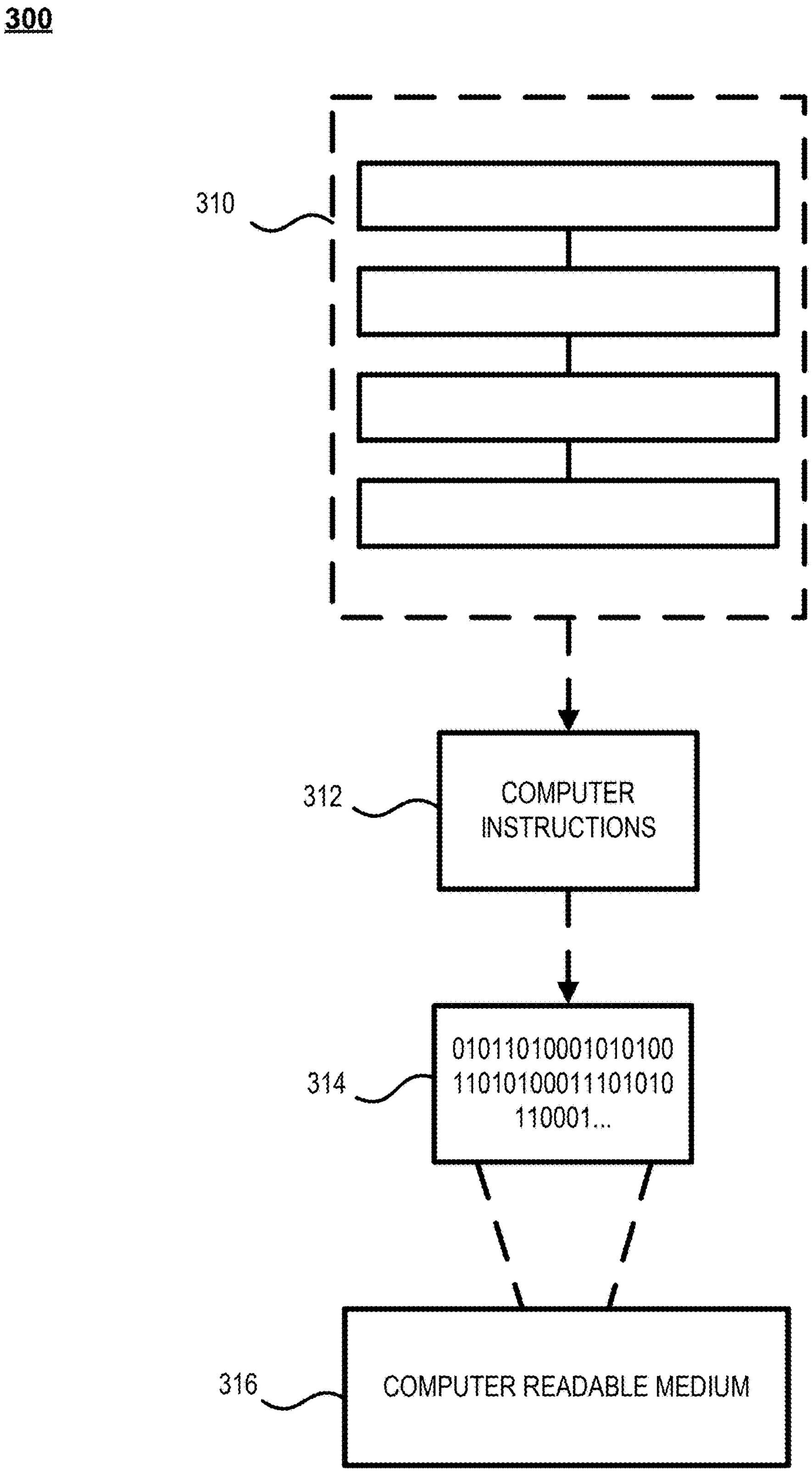
FIG. 3 is a block diagram illustrating an example computer-readable medium or computer-readable device including processor-executable instructions configured to embody one or more aspects of the present disclosure.

One or more of the aspects of the present disclosure include a computer-readable medium including microprocessor or processor-executable instructions configured to implement one or more embodiments presented herein. FIG. 3 is a block diagram illustrating an example computer-readable medium or computer-readable device including processor-executable instructions configured to embody one or more of the aspects set forth herein. As illustrated in FIG. 3, implementation 300 includes a computer-readable medium 316. Computer-readable medium 316 can include a CD-R, DVD-R, flash drive, a platter of a hard disk drive, and so forth, on which computer-readable data 314 is encoded and stored. The computer-readable data 314, such as binary data including a plurality of zero's and one's as illustrated, in turn includes a set of computer instructions 312 configured to operate according to one or more of the principles set forth herein.

In the illustrated implementation 300 of FIG. 3, the set of computer instructions 312 (e.g., processor-executable computer instructions) may be configured to perform a method 310, such as the process 500 of FIG. 5, described in more detail below, for example. In another embodiment, the set of computer instructions 312 may be configured to implement a system or platform, such as the data model platform 130 described with respect to FIG. 1 or the data model 210 described with respect to FIG. 2, for example. Many such computer-readable media may be devised by those of ordinary skill in the art that are configured to operate in accordance with the techniques presented herein.

As used in this application, the terms "component," "module," "system," "interface," "manager," "engine," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

A device may also be called and may contain some or all of the functionality of a system, subscriber unit, subscriber station, mobile station, mobile, mobile device, wireless terminal, device, remote station, remote terminal, access terminal, user terminal, terminal, wireless communication device, wireless communication apparatus, user agent, user device, or user equipment (UE). A mobile device may be a cellular telephone, a cordless telephone, a Session Initiation Protocol (SIP) phone, a smart phone, a feature phone, a wireless local loop (WALL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects may also be implemented with wired devices, or with both wired and wireless devices.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 4:
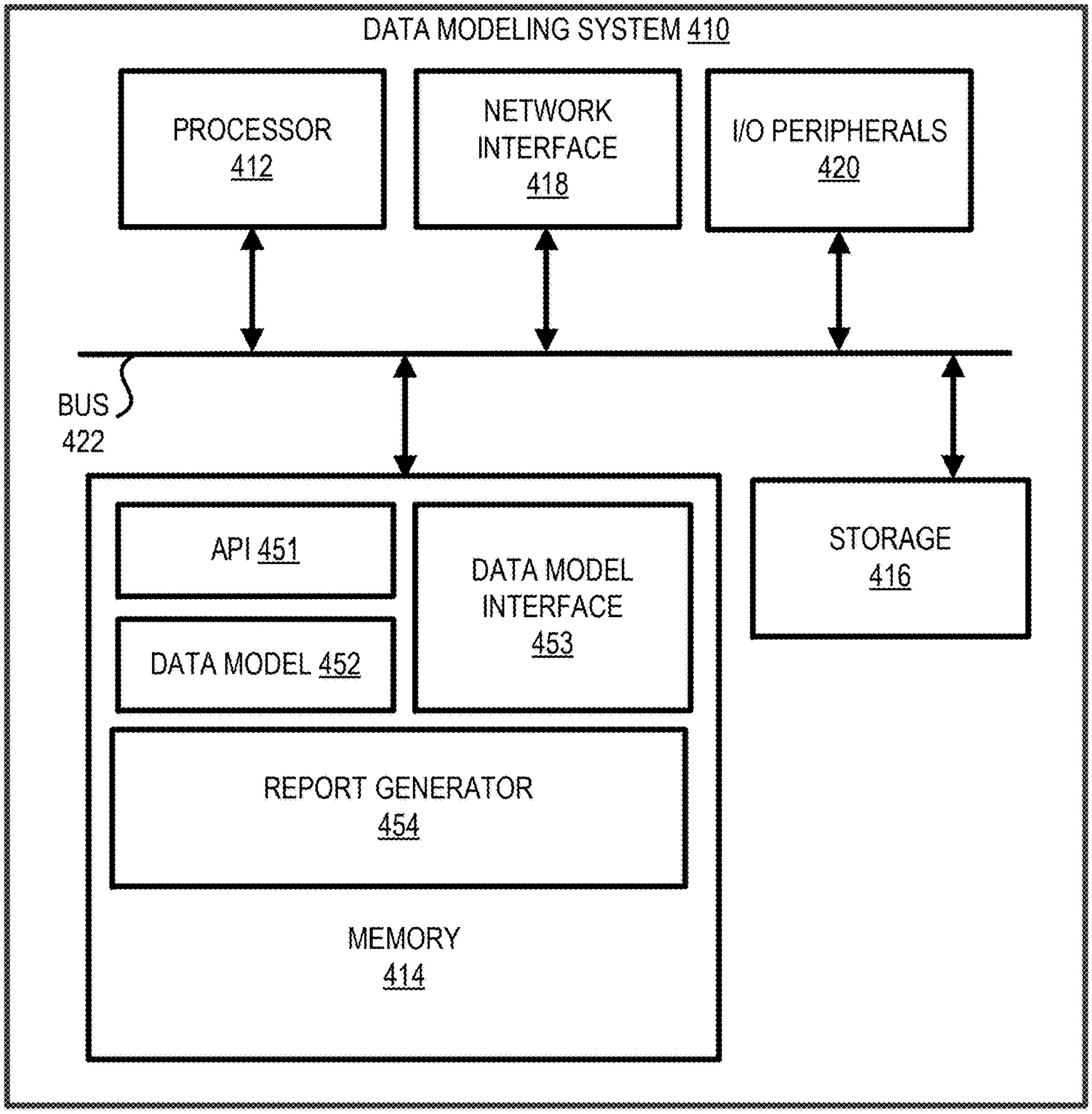
FIG. 4 is a block diagram illustrating an example system configured to generate a data model according to one or more aspects of the present disclosure

Turning now to FIG. 4, which depicts an example of a computer environment 400 for implementing examples of one or more aspects of the present disclosure. The computing environment 400 of FIG. 4 is merely one example of a suitable operating environment configured to implement a data modeling system 410 and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini-computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, APIs, data structures, and the like, which perform one or more tasks or implement one or more abstract data types. Typically, the functionality of the computer readable instructions is combined or distributed as desired in various environments.

FIG. 4 is a block diagram illustrating an example data modeling system 410 configured to generate data products using a data model 452, according to one or more aspects of the present disclosure. In one configuration, the data modeling system 410 may include at least one processor 412 and at least one memory 414. Depending on the exact configuration and type of computing device, the at least one memory 414 may be volatile, such as RAM, non-volatile, such as ROM, flash memory, etc., or a combination thereof. Examples of processor 412 include a microprocessor, an application-specific integrated circuit (ASIC), a field-programmable gate array (FPGA), or any other suitable processing device. Data modeling system 410 can include one processor, such as is illustrated by processor 412 in FIG. 6, or more than one processor.

Memory 414 may include additional features or functionality including one or more programs and/or program data that may be accessible in memory 414 by the data modeling system 410. For example, memory 414 includes API 451, data model 452, data model interface 453, and report generator 454. The one or more programs and/or program data that may be accessible in memory 414 by the data modeling system 410 (e.g., API 451, data model 452, data model interface 453, and report generator 454) may implement the functionalities described above with respect FIG. 1 and FIG. 2. For instance, API 451 may be accessed by data modeling system 410 to query the various sources for source data (e.g., sources 101 with respect to FIG. 1 and/or source data 202 with respect to FIG. 2). API 451 may be configured to function across different types of hardware and software platforms used by the various data platforms (e.g., Windows, Linux, etc.). API 451 provides a consistent and standardized way of access data across different data platforms.

Memory 414 also includes data model 452 and data model interface 453. Data model 452 can include the various modules and processing logic described with respect to FIG. 1 and FIG. 2 and be configured to generate data products (e.g., source data products 233 and/or integrated consumer data products 243) for downstream uses (e.g., data consumption 250). Data model interface 453 may be configured to communicate with a separate user computing device (e.g., user computing device 110) to receive and process requests for data products from a downstream user and/or business unit.

Memory 414 also include report generator 454. Report generator may generate, based on the requested data product, a report indicating the data product. The report may include additional information for the downstream user such as a level of quality of the data product, an indication of the data domain of the data product, metadata data tracking the data contract and the relationship of the data sets in the data product to other data domains (e.g., a data lineage), metadata specifying a sensitivity level of the data product, a status of the requested data product, and so on. The generated report assists a downstream user with gaining a better understanding of relationships between the data and the associated data product, which ultimately may aid in gaining better understanding of the state of the data and better business insights. Memory 414 may also store other programs and data not specifically identified herein.

Data modeling system 410 may include additional features or functionality. For example, the data modeling system 410 may include storage such as removable storage or non-removable storage, including, but not limited to, magnetic storage, optical storage, etc. Such storage is illustrated in FIG. 4 by storage 416. In one or more embodiments, computer readable instructions to implement one or more embodiments provided herein are in the storage 416. The storage 416 may store other computer readable instructions to implement an operating system, an application program, etc. Computer readable instructions may be loaded in the at least one memory 414 for execution by the at least one processor 412, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries, or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Still referring to FIG. 4, the computing environment 400 may also include a number of additional external or internal devices, for example, input or output devices. For example, data modeling system 410 is illustrated as including input/output (I/O) peripherals 620. I/O peripherals 420 can receive input from an input device (not shown) or provide output to output devices (not shown). Input peripherals can include a variety of different input devices such as keyboards, mouses, pens, voice input devices, touch input devices, infrared cameras, video input devices, or any other input device. Output peripherals can include a variety of different output devices such as one or more displays, speakers, printers, or any other output device may be included with the data modeling system 410.

I/O peripherals 420 may be connected to the data modeling system 410 via a wired connection, wireless connection, or any combination thereof. Further, the data modeling system 410 may include network interface 418 to facilitate communications with one or more other devices (not shown). Network interface 418 can include any device or group of devices suitable for establishing a wired or wireless data connection to one or more data networks. Non-limiting examples of the network interface 418 include an Ethernet network adaptor, a wireless network adapter, a modem, Wi-Fi adapter, Bluetooth adapter, near field communication (NFC) receiver and transmitter, and any other known wired or wireless data transmission system. Data modeling system 410 also includes bus 422. Although only one interface bus is illustrated, computing environment 400 can include more than one interface bus. Bus 422 can communicatively couple one or more components of data modeling system 410.

Example Methods for Generating Data Products Using a Data Model

Figure 5:
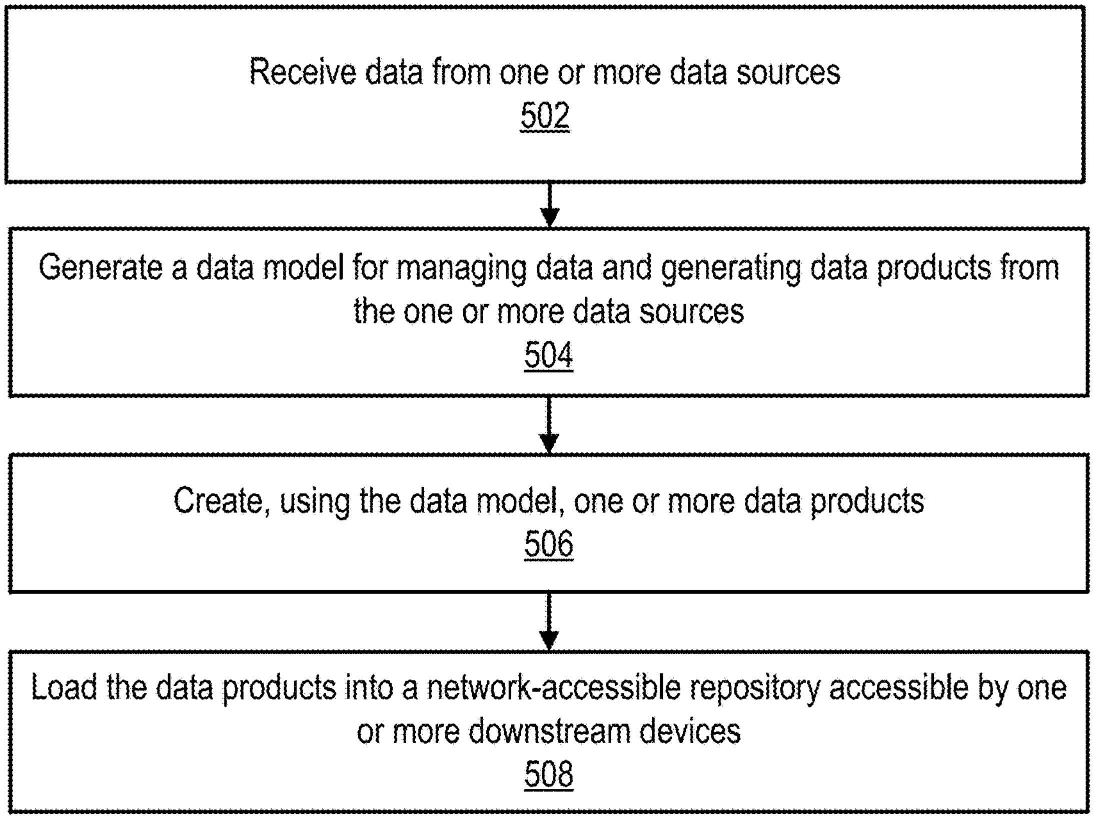
FIG. 5 is a flowchart illustrating an example process for generating a data model according to one or more aspects of the present disclosure.

Turning now to FIG. 5, which is a flowchart of an example of a process 500 for generating data products using a data model, according to one or more aspects of the present disclosure. The process 500 will be described with respect to the data model platform 130 shown in FIG. 1 and the data model 210 shown in FIG. 2; however, any suitable system or platform according to this disclosure may be employed, including the example data modeling system 410 shown in FIG. 1. Additionally, process 500 is provided in the order shown, but other orders or additional steps may be provided.

As shown in FIG. 5, the process 500 begins at step 502, when the data model platform 130 receives data from one or more data sources 101. Sources 101 can be associated with one or more data platforms having a technical and/or business relationship with an enterprise hosting the data model platform 130. Sources 101 can generate data and each of sources 101 can be aligned to a particular data domain with the enterprise setting including, but not limited to, vulnerability management data sources, software security data sources, third party cybersecurity data sources, governance and information protection data sources, network security data sources, software security data sources, defense and incident response data sources, identity and access management data sources, data security data sources, and so on. The data provided by each of the sources 101 can be unstructured. Additionally, the data from sources 101 may be received responsive to an API call generated by the data model platform 130.

Next at step 504, the data model platform 130 generates, using data model generation subsystem 138, a data model 210 for managing data and generating data products from the one or more data sources. The data model, which can include data ingestion logic 220, data integration logic 230, and data transformation logic 240, is configured to process the data received from sources 101 for downstream data consumption 250. The data model 210 includes various features and functionality to ensure the accuracy of the data received from the sources 101 such as a data contract tool 221 and a classification tool 222. Additionally, the various processing layers including the data integration logic 230 and the data transformation logic 240 may utilize one or more instances of a quality assessment tool and/or a compatibility tool (e.g., quality assessment tool 231, 241 and compatibility tool 232, 242). Quality assessment tool 231, 241, for example, can apply validation rules and data quality metrics to ensure that the data received from sources 101 is accurate and complete (e.g., to ensure no data was modified or lost and to ensure that the data being used is of high quality and suitable for its intended use case). Additionally, compatibility tool 232, 242 can simulate one or more hardware and/or software components of the downstream device engaging in data consumption 250, where the simulation is performing in a compatibility testing mode and can reveal potential errors that may occur when the data products are transmitted and viewed. Responsive to any detected errors, the data model 210 may perform remediation on the data products to ensure forward compatibility.

Then, at step 506, the data model 210, creates one or more data products 141. Data products 141 can include source data products 233 and integrated consumer data products 243. Source data products 233 aggregate data from multiple sources 101 and data sets and represent the data in a standardized format for better quality and reusability by performing a cleaning and quality check on the data, and then furnishing the source data product for further consumption. Integrated consumer data products 243 comprise and aggregation of one or more source data products 233.

Then, at step 508, the data model 210 loads the data products 141 into a network-accessible repository (e.g., data storage unit 131) accessible by one or more downstream devices for data consumption 250. A user operating user computing device 110 may interact with the data model platform 130 via user interface 111 interacting with data model application 116 to access and/or request one or more data products generated by the data model platform 130.

General Considerations

Numerous specific details are set forth herein to provide a thorough understanding of the claimed subject matter. However, those skilled in the art will understand that the claimed subject matter may be practiced without these specific details. In other instances, methods, apparatuses, or computing systems that would be known by one of ordinary skill have not been described in detail so as not to obscure claimed subject matter.

Unless specifically stated otherwise, it is appreciated that throughout this specification discussions utilizing terms such as "generating," "processing," "computing," and "determining" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The computing system or computing systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes," "having," "has," "with," or variants thereof are used in either the detailed description or the claims, such terms are intended to be inclusive in a manner similar to the term "comprising." The use of "configured to" or "based on" herein is meant as open and inclusive language that does not foreclose devices adapted to or configured to perform additional tasks or steps. The endpoints of comparative limits are intended to encompass the notion of quality. Thus, expressions such as "more than" should be interpreted to mean "more than or equal to."

Where devices, computing systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system comprising:

one or more processors; and a memory coupled to the one or more processors, the memory including instructions that, when executed by the one or more processors, cause the one or more processors to:

generate a data model for managing data and generating data products from one or more data sources, wherein the data products comprise source data products and consumer data products, the data model configured to:

establish a linkage between the data model and a data platform hosting the one or more data sources to thereby establish a data contract with one of the data sources, the linkage specifying a relationship between at least two disparate data domains associated with the one or more data sources for cross-verification of data extraction accuracy;

validate a data variance between source datasets from the at least two disparate data domains using the linkage and integrate one or more source datasets together to thereby generate a source data product responsive to the data variance satisfying a threshold; and transform one or more source data products into a consumer data product, the consumer data product being aligned with a functional context of a particular data domain and tagged with metadata tracking the linkage of the data contract;

create, using the data model, one or more data products; and load the data products into a network-accessible repository accessible by one or more downstream devices, each downstream device being associated with a domain specific entity.

2. The system of claim 1, wherein the particular data domain is defined in accordance with enterprise-established guidelines.

3. The system of claim 1, wherein the data received from the one or more data sources is unstructured, and wherein the data model is further configured to transform the data into a structured format.

4. The system of claim 1, wherein the data model is further configured to:

query the one or more data sources via an API to extract metadata associated with the data received from the one or more data sources, wherein the data is classified based on extracted metadata and based on one or more classification guidelines.

5. The system of claim 1, wherein the the data model is further configured to determine a level of quality associated with the one or more source datasets, wherein determining the level of quality comprises performing a set of validation rules on the one or more source datasets to validate the data variance between the one or more source datasets received by the data model and a raw form of the one or more source datasets stored at the one or more data sources.

6. The system of claim 1, wherein the data model is further configured to perform data lineage tracking and tag the data products with a data lineage.

7. The system of claim 6, wherein performing the data lineage tracking comprises extracting data associated with a source of data associated with the data products and data associated with one or more processing steps performed by data model.

8. The system of claim 1, wherein the data model is further configured to:

test compatibility of the data products with a downstream device of the one or more downstream devices by configuring the one or more processors to operate in a testing mode that simulates hardware and software components of the downstream device to identify usability errors in the data products; and modify the data products responsive to identification of the usability errors to ensure compatibility of the data products with the hardware and software components of the downstream device.

9. A method comprising:

generating a data model for managing data and generating data products from one or more data sources, wherein the data products comprise source data products and consumer data products, the data model configured to:

establish a linkage between the data model and a data platform hosting the one or more data sources to thereby establish a data contract with one of the data sources, the linkage specifying a relationship between at least two disparate data domains associated with the one or more data sources for cross-verification of data extraction accuracy;

validate a data variance between source datasets from the at least two disparate data domains using the linkage and integrate one or more source datasets together to thereby generate a source data product responsive to the data variance satisfying a threshold; and transform one or more source data products into a consumer data product, the consumer data product being aligned with a functional context of a particular data domain and tagged with metadata tracking the linkage of the data contract;

creating, using the data model, one or more data products; and loading the data products into a network-accessible repository accessible by one or more downstream devices, each downstream device being associated with a domain specific entity.

10. The method of claim 9, wherein the particular data domain is defined in accordance with enterprise-established guidelines.

11. The method of claim 9, wherein the data received from the one or more data sources is unstructured, and wherein the data model is further configured to transform the data into a structured format.

12. The method of claim 9, further comprising:

querying the one or more data sources via an API to extract metadata associated with the data received from the one or more data sources, wherein the data is classified based on extracted metadata and based on one or more classification guidelines.

13. The method of claim 9, further comprising:

determining, by the data model, a level of quality associated with the one or more source datasets, wherein determining the level of quality comprises performing a set of validation rules on the one or more source datasets to validate the data variance between the one or more source datasets received by the data model and a raw form of the one or more source datasets stored at the one or more data sources.

14. The method of claim 9, further comprising:

performing, by the data model, a data lineage tracking and tagging the the data products with a data lineage.

15. The method of claim 14, wherein performing the data lineage tracking comprises extracting data associated with a source of data associated with the data products and data associated with one or more processing steps performed by data model.

16. The method of claim 9, wherein the data model is further configured to:

test a compatibility of the data products with a downstream device of the one or more downstream devices by configuring one or more processors of a computing device to operate in a testing mode that simulates hardware and software components of the downstream device to identify usability errors in the data products; and modifying the data products responsive to identification of the usability errors to ensure compatibility of the data products with the hardware and software components of the downstream device.

17. A non-transitory computer-readable medium embodying program code that is executable by one or more processors to cause the one or more processors to:

generate a data model for managing data and generating data products from one or more data sources, wherein the data products comprise source data products and consumer data products, the data model configured to:

establish a linkage between the data model and a data platform hosting the one or more data sources to thereby establish a data contract with one of the data sources, the linkage specifying a relationship between at least two disparate data domains associated with the one or more data sources for cross-verification of data extraction accuracy;

validate a data variance between source datasets from the at least two disparate data domains using the linkage and integrate one or more source datasets together to thereby generate a source data product responsive to the data variance satisfying a threshold; and transform one or more source data products into a consumer data product, the consumer data product being aligned with a functional context of a particular data domain and tagged with metadata tracking the linkage of the data contract;

create, using the data model, one or more data products; and load the data products into a network-accessible repository accessible by one or more downstream devices, each downstream device being associated with a domain specific entity.

18. The non-transitory computer-readable medium of claim 17, wherein the data model is further configured to determine a level of quality associated with the one or more source datasets, wherein determining the level of quality comprises performing a set of validation rules on the one or more source datasets to validate the data variance between the one or more source datasets received by the data model and a raw form of the one or more source datasets stored at the one or more data sources.

19. The non-transitory computer-readable medium of claim 17, wherein the data model is further configured to:

query the one or more data sources via an API to extract metadata associated with the data received from the one or more data sources, wherein the data is classified based on extracted metadata and based on one or more classification guidelines.

20. The non-transitory computer-readable medium of claim 17, wherein the data model is further configured to:

test compatibility of the data products with a downstream device of the one or more downstream devices by configuring the one or more processors to operate in a testing mode that simulates hardware and software components of the downstream device to identify usability errors in the data products; and modify the data products responsive to identification of the usability errors to ensure compatibility of the data products with the hardware and software components of the downstream device.

* * * * *